United States Patent [19]
Nishiyama et al.

[11] Patent Number: 5,937,360
[45] Date of Patent: *Aug. 10, 1999

[54] PORTABLE RADIO TELEPHONE SET

[75] Inventors: Takanori Nishiyama, Mitaka; Kazunori Yanagisawa, Higashiyamato; Sakae Itakura, Ayase, all of Japan

[73] Assignee: Hitachi, Ltd., Tokyo, Japan

[*] Notice: This patent is subject to a terminal disclaimer.

[21] Appl. No.: 08/956,787

[22] Filed: Oct. 23, 1997

Related U.S. Application Data

[63] Continuation of application No. 08/375,409, Jan. 18, 1995, Pat. No. 5,742,912, which is a continuation of application No. 08/117,326, Sep. 7, 1993, Pat. No. 5,436,954.

[30] Foreign Application Priority Data

Sep. 8, 1992 [JP] Japan .................................. 4-239735

[51] Int. Cl.$^6$ ........................................................ H04Q 7/32
[52] U.S. Cl. ............................................ 455/566; 455/550
[58] Field of Search .................................... 379/428, 433, 379/434; 455/550, 566, 575, 90

[56] References Cited

U.S. PATENT DOCUMENTS

| | | |
|---|---|---|
| 4,481,382 | 11/1984 | Villa-Real . |
| 4,739,128 | 4/1988 | Grisham . |
| 4,845,772 | 7/1989 | Metroka et al. . |
| 5,027,394 | 6/1991 | Ono et al. . |
| 5,260,998 | 11/1993 | Takagi . |
| 5,278,993 | 1/1994 | Reiff et al. . |
| 5,422,656 | 6/1995 | Allard et al. . |
| 5,465,401 | 11/1995 | Thompson . |
| 5,742,912 | 4/1998 | Nishiyama et al. ................ 455/566 |

FOREIGN PATENT DOCUMENTS

| | | |
|---|---|---|
| 0373387 | 6/1990 | European Pat. Off. . |
| 0463856 | 1/1992 | European Pat. Off. . |
| 4008598 | 9/1991 | Germany . |
| 56-46353 | 4/1981 | Japan . |

*Primary Examiner*—Curtis A. Kuntz
*Assistant Examiner*—William G. Trost
*Attorney, Agent, or Firm*—Antonelli, Terry, Stout & Kraus, LLP

[57] ABSTRACT

A portable radio telephone set provided with a display section includes a rotary selector which turns to select various functions. A menu displayed on the display section is selected by the rotary selector during a non-conversation time, and the sound volume can be adjusted during the conversation time. The adjusting operation can be performed from both the front and, the rear sides of the telephone set. The rotary selector and button keys are arranged within the operation range of the thumb, and ordinary dial functions performed by operating these rotary selector and button keys are provided.

4 Claims, 7 Drawing Sheets

PORTABLE RADIO TELEPHONE SET

This application is a Continuation of application Ser. No. 08/375,409, filed Jan. 18, 1995, now U.S. Pat. No. 5,742,912, which is a continuation of application Ser. No. 08/117,326, filed Sep. 7, 1993 now U.S. Pat. No. 5,436,954, issued Jul. 25, 1995.

BACKGROUND OF THE INVENTION

1. Field of the Invention

The present invention relates to a portable radio terminal and, more particularly, to a portable radio telephone set having a folding and housing control mechanism and a rotary selector for selecting various functions provided in a hinge section for folding and housing purpose.

2. Description of the Related Art

Conventional portable radio telephone sets (hereinafter referred to simply as telephone sets) are not only provided with ordinary telephone functions, but also with an electronic telephone directory function by which telephone numbers and names can be registered, a help function for guiding various functions, an incoming call tone selection function for selecting incoming call tone, and the like, thus being formed as a multi-functional terminal. The conventional portable radio telephone set uses function buttons in order to select such functions. The operation of some terminals has been made easier by making the shape of function buttons different from that of the dial buttons.

When, for example, the electronic telephone directory function is used, first a telephone set user operates a function button for the electronic telephone directory function in order to call a telephone number stored in the electronic telephone directory onto a display section of the portable radio telephone set. Then, the telephone set user operates a function button for selecting the telephone number and a function button for scrolling the registered telephone numbers in order to call the wanted telephone number shown on the display section from among telephone numbers registered in the electronic telephone directory. When the wanted telephone number is confirmed on the display section by the above operation, the user operates a function button for starting a conversation in order to call the other party.

Though the conventional portable radio telephone set is multi-functional, the operation procedure thereof is complex for a user when the series of operations described above is considered. Furthermore, there is the possibility that the greater the number of buttons, the greater the chances that a button may be depressed erroneously when the button arrangement of a present portable radio telephone set is considered.

That is, in view of the complexity of such an operation procedure, it is not easy, as regards a conventional telephone set in which functions are selected by function buttons, to operate various buttons with only one hand while holding the telephone set itself in the same hand.

SUMMARY OF THE INVENTION

It is an object of the present invention to provide a telephone set which makes it possible to easily perform various operations required particularly for conducting a radio telephone conversation with one hand while the telephone set itself is being held by the same hand.

It is another object of the present invention to simplify the procedure for selecting or operating a plurality of functions of the telephone set.

It is still another object of the present invention to provide a multi-functional telephone set, the number of buttons thereof being reduced as much as possible.

To achieve the above-described objects, a portable radio telephone set in accordance with the present invention is provided, which portable radio telephone set has a display section, comprising a rotary selector which turns to select various functions. A menu of various functions displayed on the display section is selected when the rotary selector is operated during a non-conversation time, sound volume can be adjusted during a conversation time, the adjusting operation can be performed from both the front and rear sides of the telephone set. The rotary selector and button keys are arranged within the operation range of the thumb, and thus ordinary dial functions, performed by operating the rotary selector and the button keys, are provided.

According to the present invention, since the rotary selector is provided as a telephone terminal, it is possible to easily select a desired function of the telephone terminal with one hand by rotating the selector.

Also, according to the present invention, since the rotary selector is provided in a hinge section of a telephone terminal which is foldable so that it can be housed, it is possible to select a desired function of the telephone terminal by rotating the rotary selector.

Since the rotary selector is provided in the hinge section of the telephone terminal which is foldable so it can be housed, the hinge section can be of any size, and the mechanical strength of the hinge section is increased. The provision of the rotary selector results in a reduction number of key buttons for performing multiple functions, or the like, making it possible to more effectively use the space where the telephone set is arranged.

Also, by arranging the rotary selector provided in the terminal so as to be rotatable and slidable along the shaft of the hinge, the rotary selector can be used as a cursor. Further, by moving the cursor on the display section up and down, or from side to side in linkage with the rotary selector in this way, various functions of a portable telephone set can be performed, and it is made easy to perform an operation with one hand.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 6 is a partial sectional view of the joint portion and the receiver portion of the radio telephone set, a display section, and the like;

DETAILED DESCRIPTION OF THE PREFERRED EMBODIMENTS

Preferred embodiments of the present invention will be explained below with reference to the accompanying drawings of FIG. 1 through FIG. 9.

Figure 1:
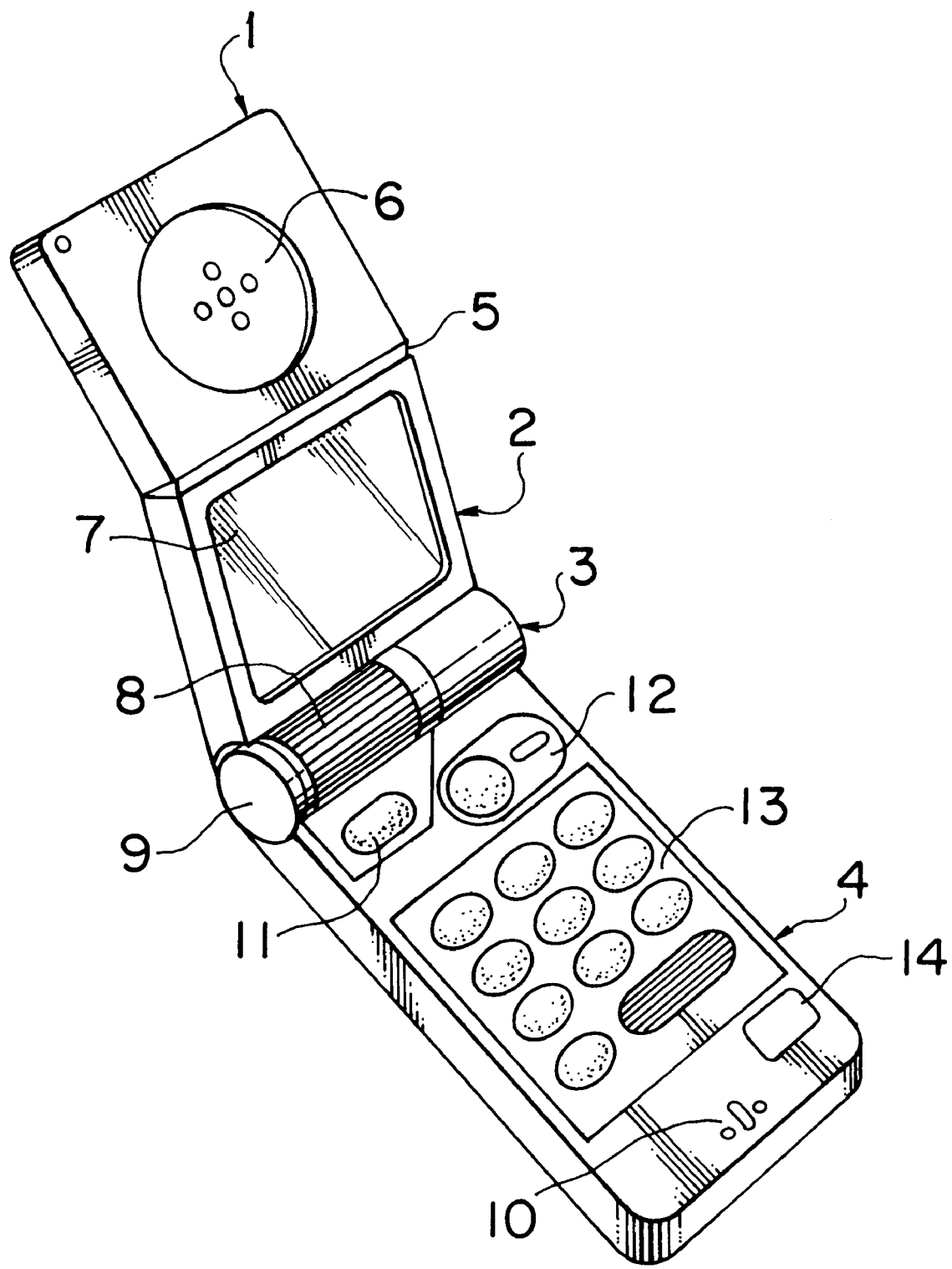
FIG. 1 is a perspective view illustrating the appearance of a portable radio telephone set in accordance with an embodiment of the present invention.

The appearance of a telephone set in accordance with the present invention will be explained first. FIG. 1 illustrates in perspective the overall appearance of the main body of the telephone set when the folded state thereof is released and it is placed in a use state. In this case, a receiver section 1 and a display section 2 are freely flexed and engaged with each other via a hinge 5. These sections are engaged with an operation section 4 via a joint portion 3 by which the telephone set is folded and rotated so as to be housed. A receiver (speaker for outputting received voice sound) 6 is provided in the central portion of the receiver section 1. When this receiver is brought into contact with the ear of a party (user) during a radio telephone conversation, a voice sound from the other party is heard. Since, as shown in the figure, the hinge 5 is flexed to form a V shape, it is easy to operate the telephone set during the radio telephone conversation state. The joint portion 3 maintains the state in which the telephone set is rotated after the main body of the telephone set is folded and housed, that is from the use state, and is provided with a selector 8 for selecting functions, a rotation operation mechanism, and a push-button 9. A set button 11 for storing/retrieving and inputting/outputting information, a call origination (re-origination) button 12 for starting a conversation, a ten-key portion 13, and a termination button 14 for terminating a conversation are provided in the operation section 4, a microphone 10 being contained in the front end portion of the main body. With this construction, when a radio telephone conversation function is selected by the selector 8, a telephone set user brings the receiver 6 into contact with the ear, and the user's mouth is brought close to the microphone 10 as in a handset of a conventional telephone set, a radio telephone conversation with the other party then being conducted. Keyed-in information and necessary information from among stored information are called and displayed on a liquid-crystal display screen 7 disposed in the central portion of the display section 2.

Figure 2:
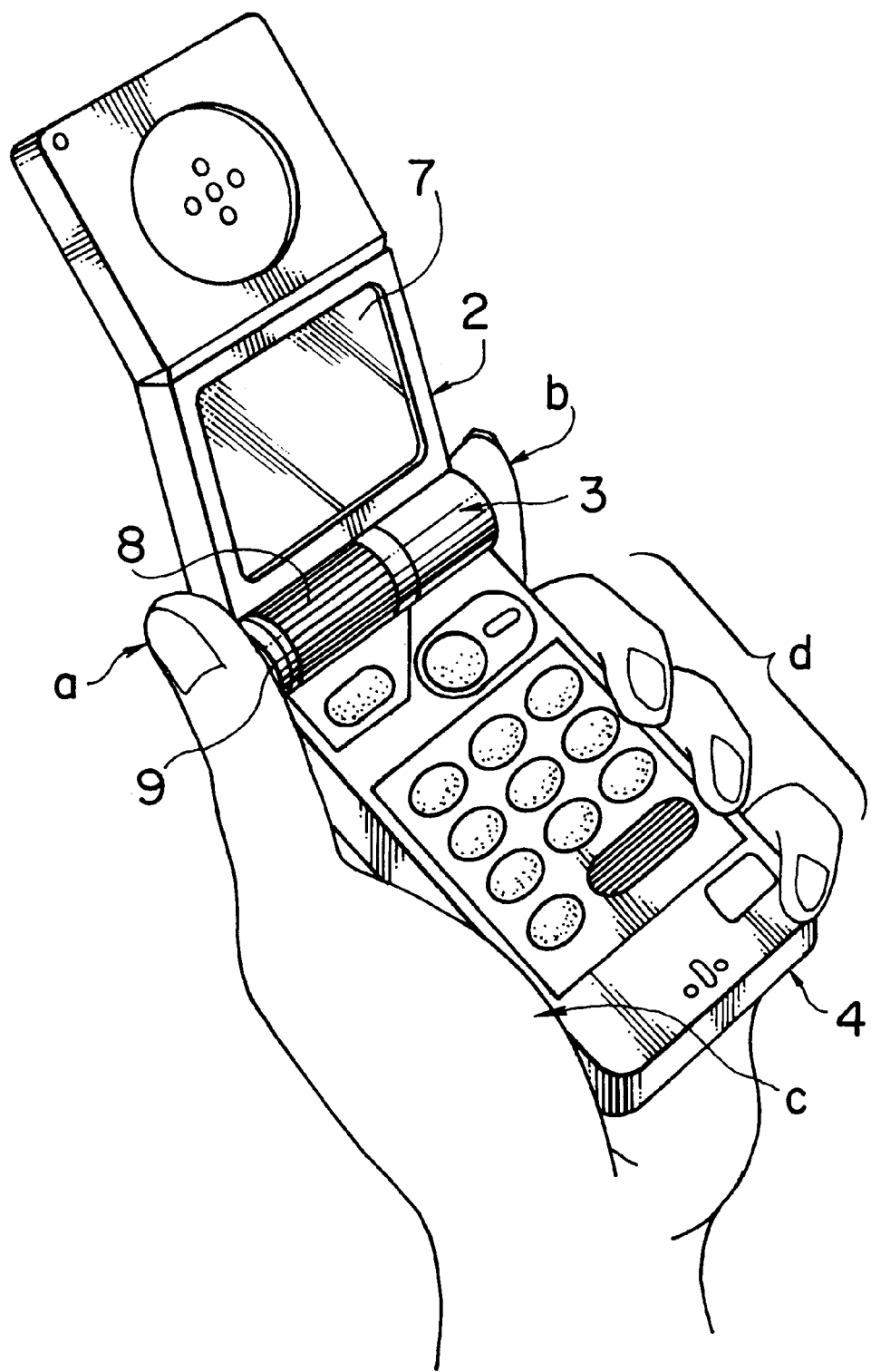
FIG. 2 is a perspective view illustrating a state in which the portable radio telephone set shown in FIG. 1 is used while it is held with one hand.

FIG. 2 illustrates a state in which the telephone set is being used while it is held by one hand (the left hand in this embodiment). The telephone set user grasps both end portions of the joint portion 3 between the thumb "a", and the forefinger "b". The push-button 9 is depressed by the thumb "a" in order to rotate the display section 2 and the receiver section 1 via the joint portion 3, thereby shifting the state of the telephone set from the state in which it is folded and housed to a stable use state. Since the main body of the telephone set is basically held by the thenar "c" and the remaining three fingers "d", an accident, such as the main body of the telephone set falling from the hand, does not occur even if the thumb "a" and the forefinger "b" are separated from the main body of the telephone set. Therefore, if the main body of the telephone set is held as shown in FIG. 2, the telephone set user can operate the selector 8 and various operation buttons on the operation section 4 with the thumb "a" while simultaneously confirming a display on the liquid-crystal display screen 7.

Figure 3:
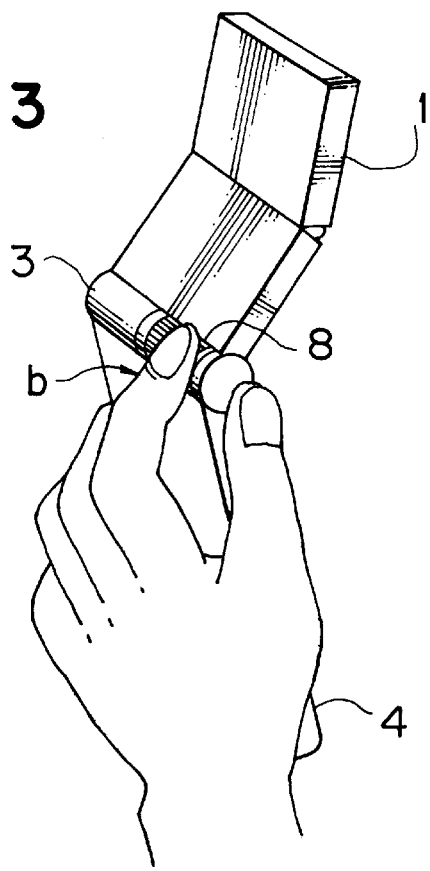
FIG. 3 is a perspective view illustrating a state in which the portable radio telephone set is used during a radio conversation state as it is seen from the outer side (the rear side) thereof.

FIG. 3 is a perspective view of the portable radio telephone set as it is seen from the outer side (the rear side) thereof, illustrating a state in which the radio telephone set is used during a radio telephone conversation. As shown in FIG. 3, the forefinger "b" is separated from one end of the joint portion 3, and the selector 8 is operated by the forefinger "b". As a result, the selector 8 can be operated by the thumb "a" from the inner surface thereof, and also by the forefinger "b" from the outer surface thereof.

Therefore, the selector 8 is provided in the joint portion 3 so as to select various functions (to be specific, call origination/reception, telephone number, secrecy, input, output, storage, calculation, time, remote control, schedule, call, clear, calendar, dictionary, map, characters, numerals, or the like) during a non-radio telephone conversation time, and so as to function to adjust the volume of the received voice sound during a radio telephone conversation time. The selector 8 is provided in such a way that the selector 8 is rotatable and can be operated from both the inner and outer surfaces.

Figure 4:
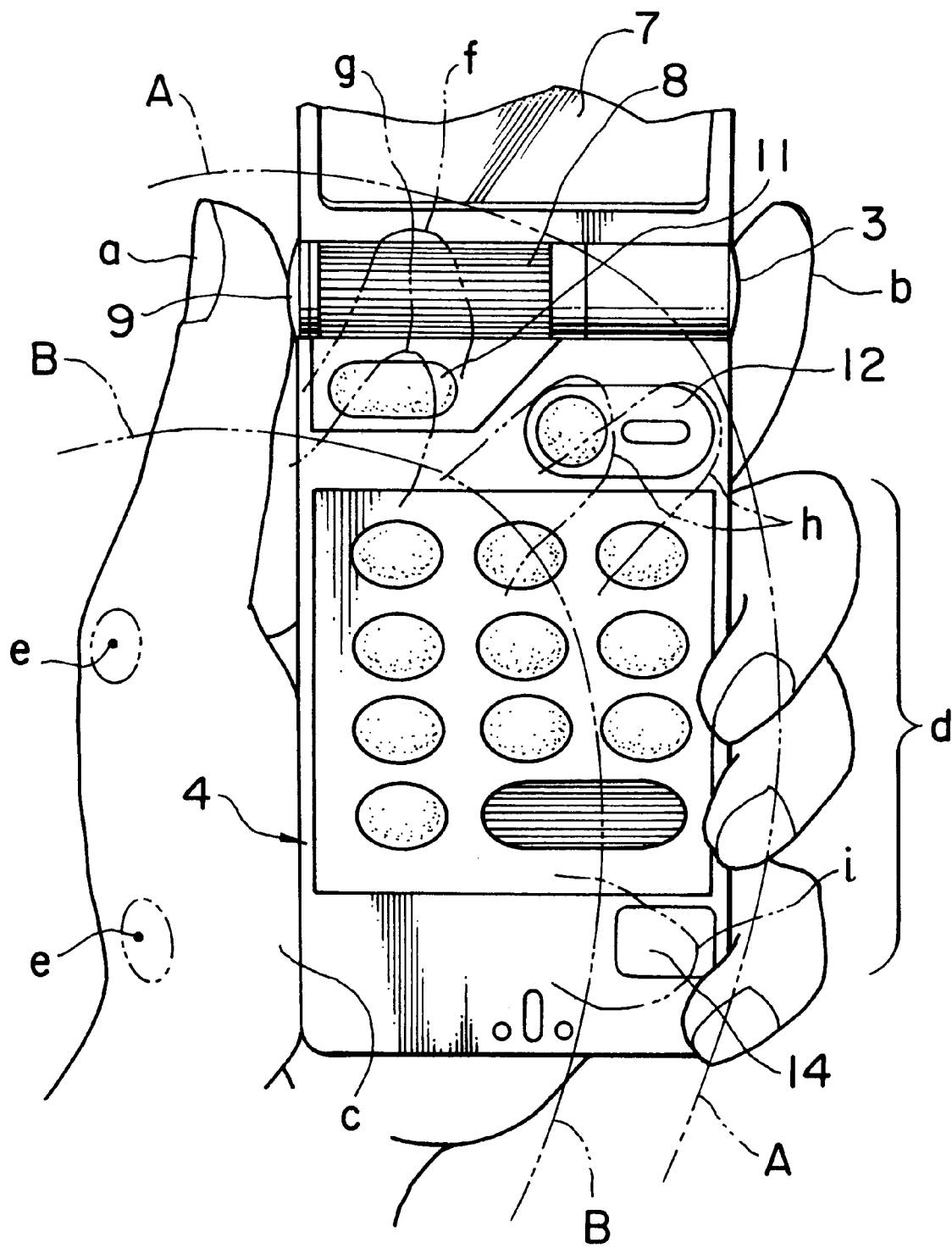
FIG. 4 is an illustration of a one-hand operation method in a state in which the radio telephone set is held with one hand.

FIG. 4 illustrates a one-hand operation method in a state in which the radio telephone set is held with one hand. As shown in the figure, in the main body of the telephone set, the right and left ends of the operation section 4 are held by the thenar "c" and the three fingers "d". If the push-button 9 is depressed by the thumb "a", the folded and housed telephone set can be shifted to a stable use state, i.e., a radio telephone conversation state, by rotating the receiver section 1 and the display section 2 via the joint portion 3.

An example of a case in which a radio telephone conversation is conducted in this use state will be explained. First, the telephone set user selects by using the selector 8 a list display function (one function of the telephone set) for displaying a list of names and their telephone numbers. The available selection methods include a method in which a list of functions is displayed beforehand on the liquid-crystal display screen 7 and a cursor which is moved in linkage with the rotation of the selector 8 or the like is moved up and down to identify any one of the functions, a method in which the selector itself is provided with a change-over switch corresponding to multiple functions, the selector being switched to select any one of the functions. The functions can be more easily selected by using the selector 8 in addition to the key buttons. Next, a list of the prestored names and their telephone numbers is displayed on the liquid-crystal display screen 7, and a wanted telephone number is retrieved by scrolling the display screen using the selector 8. In the above display and retrieval method, only the selector 8 needs to be operated. As a result, an operation for switching the selector 8 at a thumb position "f" is possible. Further, when the telephone number of the other party is confirmed, a set button 11 is depressed at a thumb position "g", and a call origination (re-origination) button 12 is operated, allowing a radio telephone conversation to start. When the radio telephone conversation is terminated, a termination button 14 is depressed at a thumb position "i" in order to complete the series of operations necessary for conducting a radio telephone conversation. That is, the range in which the liquid-crystal display screen 7 can be visually confirmed and in which the thumb "a" can be moved to operate the selector 8, the call origination (re-origination) button 12, and the termination button 14 is assumed to be the range defined by the broken lines A and B shown in the figure. In this range, necessary operations can be performed by the thumb "a". In other words, this range is a range in which the thumb "a" is rotated, turned, moved back and forth, and bent in a combined manner at a joint "e" about the base of a human's phalanx in the thumb "a". Therefore, when the selector 8 and various buttons required for a radio conversation are arranged in the range defined by the broken lines A and B, since the selector 8 and the buttons are operated with one hand, the ease with which the telephone set is operated with one hand is enhanced.

Figure 9:
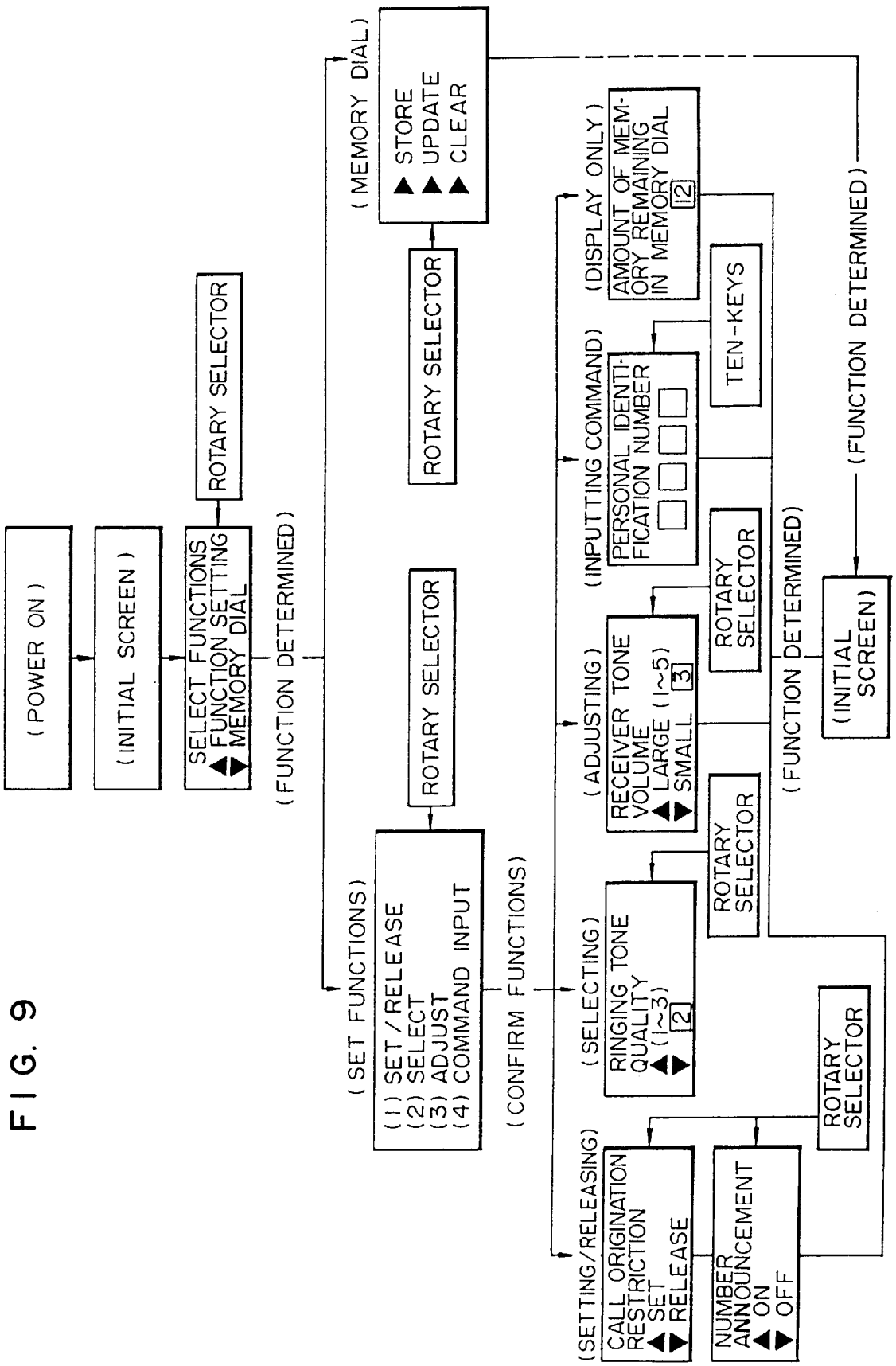
FIG. 9 is a flowchart showing a selection of various functions by using the rotary selector of the radio telephone set.

An example in which these various functions are selected by the selector 8 will now be explained with reference to the flowchart in FIG. 9. When the telephone set is opened for use from the state in which it is housed because the push-button 9 is depressed by the thumb "a", the power supply is turned on, and the initial screen appears on the liquid-crystal display screen 7, on which screen date, time, and the like are displayed. When the set button 11 is depressed, a function screen appears on the display screen 7. The displayed function setting and the memory dial are cursor-moved by turning the selector 8. Then, a function is selected, and the function is determined by operating the set button 11.

When a function setting is selected in such function selection, functions "Set/Release", "Select", "Adjust", "Command input" and "Display only" are successively displayed as a result of the turning of the selector 8, making scrolling retrieval possible and allowing these selected functions to be confirmed. When these functions are selected and set by the set button 11, call origination restriction is set or released in "Set/Release", turning on/off of number announcement is selected by the cursor movement caused by the turning of the selector 8 and determined by the set button 11, and the screen returns to the initial screen. When the function "Select" is selected and set, the selectable range of ringing tone quality is displayed, and it is possible to select the tone quality by turning the selector 8 while displaying the current situation. After the tone quality is determined by the set button 11, the screen returns to the initial screen. When the function "Adjust" is selected and set, the selectable range of the receiver tone volume is displayed, and it is possible to select the tone volume by turning the selector 8 while displaying the current situation After the receiver tone volume is determined by the set button 11, the screen returns to the initial screen. When the function "Command input" is selected and set, a display screen for inputting four digits of a personal identification number appears, making it possible to input the number by using the buttons of the ten-key section 13. The number is set by the set button 11 after it is input, and the screen returns to the initial screen. When the function "Display only" is selected and set, the amount of the remaining memory of the memory dial is displayed, and the screen returns to the initial screen.

When the memory dial is selected in the function selection, "Store", "Update", and "Clear are" displayed on the display screen 7 are set by the selector 8 as a result of the turning thereof, and set by the set button 11, making it possible to proceed to the subsequent functions.

Although in the above-described operation, functions are determined by the set button 11, the selector 8 may be moved axially so as to have the same functions as those of the set button 11 as in a joystick 29 (FIG. 5) which will be described later. In such a case, the ease with which the telephone set is operated with one hand is enhanced even more.

Figure 5:
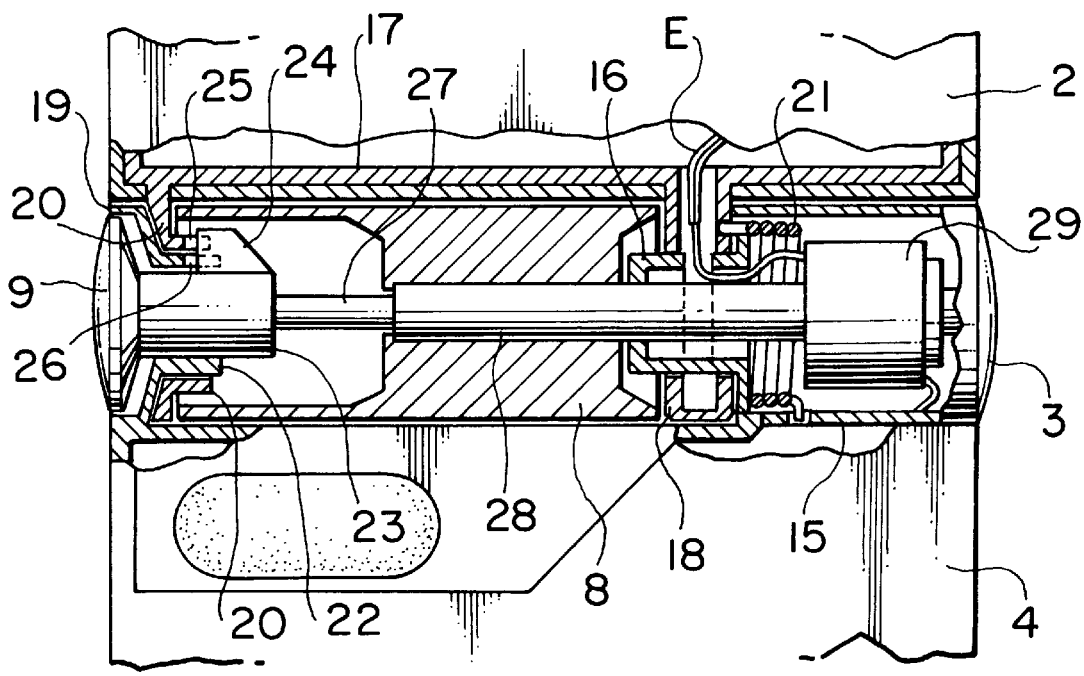
FIG. 5 is a partial sectional view of a joint portion of the radio telephone set in accordance with the embodiment of the present invention.

FIG. 5 is a partial sectional view of the joint portion 3 of the radio telephone set in accordance with the present invention. The joint portion 3 is formed of a case 15 and a button shaft 19 is and fixed to the operation section 4. A boss shaft 16 is formed in the central end surface portion of the case 15, and the boss shaft 16 and a hollow flange 18 are rotatably engaged with each other. Similarly, a sleeve shaft 22 is formed in the button shaft 19, and the sleeve shaft 22 and a sleeve flange 20 are rotatably engaged with each other. The rotatable hollow flange 18 and the sleeve flange 20 are fixed by a chassis 17 which is stably fixed inside the display section 2. In this way, the operation section 4 and the display section 2 are freely engaged with each other in such a way that they can be folded on one another via the joint portion 3.

The push-button 9 can be movably inserted into the end surface of the button shaft 19. A shank 23 formed on the push-button 9 is slidably fitted into the inside of the sleeve shaft 22. A stopper piece 24 is disposed on the shank 23 is engaged with notches 25 and 26 formed in the end surfaces of the sleeve shaft 22 and the sleeve flange 20. As a result, the rotation of the sleeve flange 20 is stopped, and consequently the rotation of the display section 2 is stopped stably. The notch 26 of the sleeve shaft 22 does not allow the engagement of the stopper piece 24 to be released for the maximum axial stroke of the push-button 9. In contrast, the engagement of the notch 25 of the sleeve flange 20 can be released and freely rotated. The notch 25 of the sleeve flange 20 is formed at an open position where the telephone set is being used and at a housing position (not shown) where it is folded and housed.

Further, a torsion coil spring 21 is disposed inside the case 15. One end of the torsion coil spring 21 is connected and fixed to the case 15, and the other end thereof is extended from the case 15 and engaged with a spring hole formed in the hollow flange 18. As a result, if the push-button 9 is depressed, the stopper piece 24 releases the stoppage at the notch 25 (not shown) when it is housed, and the elastic force of the torsion coil spring 21 is released, causing the hollow flange 18 to rotate. Therefore, the receiver section 1 and the display section 2 are rotated, becoming ready for use.

Since some elastic force still remains in the torsion coil spring 21 in the above connection in the use state, a rotational force is given continuingly in the direction in which the remaining elastic force is released. This mean that unwanted jarring, which may occur when the telephone set is used, is prevented by the rotational force thereof.

Further, when a selector shaft 28 engaging with the selector 8 moves along the axis thereof when the mechanical position thereof is read, the stroke stops at the end surface of the shank 23 so as to serve as a stopper. The press fitting between the shank 23 and a shaft 27 is not released by such an operation force acting on the selector shaft 28. The selector shaft 28 and the shaft 27 are able to slide axially and turn around the shaft thereof on one shaft. The shaft 27 is supported so as to be slidable and turnable inside the selector shaft 28, and the other end reaches the joystick 29. Further, the selector shaft 28 extends close to the center of the joint portion 3, and the selector 8 is press-fitted to the end. The selector 8 is able to smoothly slide axially and turn around the shaft thereof without contacting other components.

Next, the joystick 29 will be explained. Disposed inside the joystick 29 are a power-supply switch (not shown) working with the shaft 27, a volume control (for adjusting the receiver tone volume) which operates in response to the movement of the selector shaft 28, a sensor (for selecting functions), and the like. Examples of the sensor are a mechanical sensor, an electrical sensor, or an optical sensor. In short, the sensor detects the rotational position of the selector shaft 28 the sliding operation along the rotational shaft, and sends a signal to the liquid-crystal display screen 7 so that function selection/setting shown in FIG. 9 is performed and the screen is switched. Examples of methods performed by the power-supply switch are a method in which the position of the selector shaft is detected by the sensor and the power supply is turned on/off, and a method in which simply one end of the selector shaft 28 and the surface which the one end contacts are formed into an electrical contact point, and it is made to work with the depressing of the push-button 9. If the turning on/off of the push-button 9 is made to work in linkage with the turning on/off of the power-supply switch as in these methods, the telephone set user depresses the push-button 9 in order to make the telephone set in a folded and housed state shift to a use state, the power supply of the telephone set can be turned on, making it unnecessary to provide a key button exclusively used for the power-supply switch in the operation section 4. More specifically, when the telephone set is shifted to a state in which it is placed in a use state from the folded and housed state, the power supply of the telephone set can be inevitably turned on without operating a key button exclusively used for the power supply. The sensor inside the joystick 29 works not only with the selector shaft 28, but also with the operation of the function button in the operation section 4, and functions can be selected from the operation section 4.

The functions selected in this way reach a display processing circuit (not shown) via a cord E, and various displays necessary for performing the functions are made. Although in the embodiment the selector 8 works for controlling the position of a cursor, a selector exclusively used for controlling the position of the cursor, in addition to the selector 8, may be disposed near the selector 8.

Figure 6:
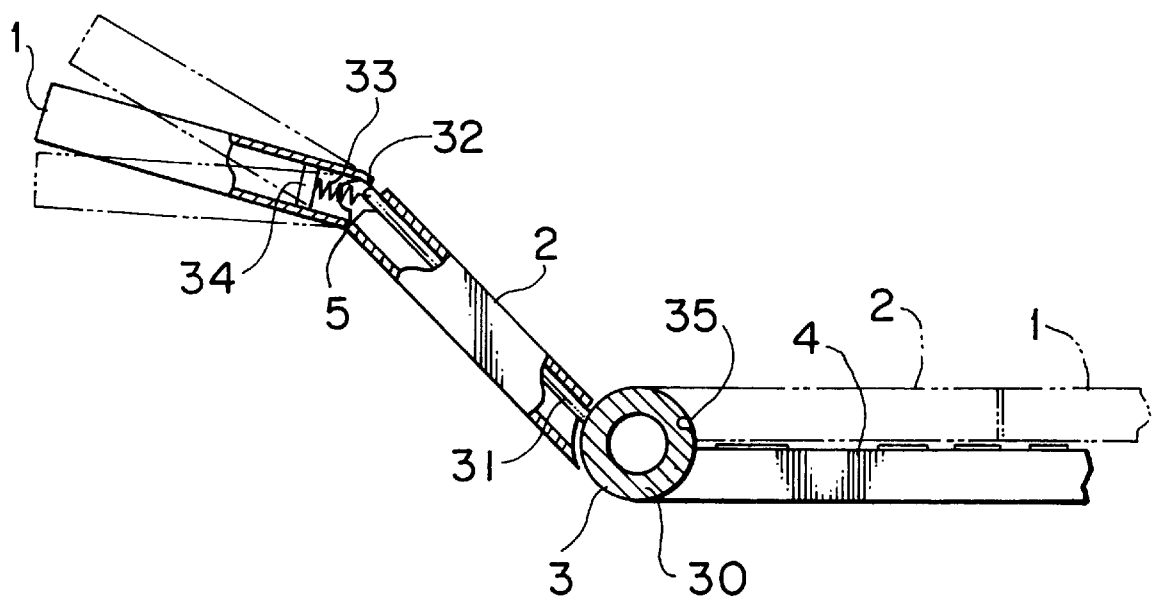

FIG. 6 is a partial sectional view of the joint portion 3, the receiver section 1, and the display section 2. As shown in the figure, the display section 2 is able to turn along a slide ring 30 which serves as a part of the joint portion 3 fixed to the operation section 4. Inside the display section 2, one end of a fine slide pin 31 is always pressed against and built onto the slide ring 30. The other end of the slide pin 31 is rotatably engaged with a hinge piece 32 which works with the hinge 5 by which the junction between the display section 2 and the receiver section 1 is made flexible. An elastic spring 33 is fixed to the hinge piece 32, and the other end is fixed to a spring seat 34 formed inside the receiver section 1 As shown in the figure, the receiver section 1 stabilizes at the flex position as indicated by the solid line by the action of the elastic spring 33. When an unnecessary force acts on the receiver section 1, since the receiver section 1 is turned as indicated by the broken line, the telephone set itself is protected, and the receiver section 1 contacts the user's ear with elastic properties during a non-radio telephone conversation. Thus, received voice can be heard in a satisfactory mannar. When the telephone set is folded and housed, the receiver section 1 and the display section 2 are folded via the joint portion 3 as indicated by the broken line. Since, at that time, the slide pin 31 engages with a notch 35 of the slide ring 30, formed at the position at which the telephone set is housed, the receiver section 1 and the display section 2 are folded stably. At the folded time, the hinge piece 32 which works with the slide pin 31 is retracted into the display section 2. Therefore, the receiver section 1, which is flexed with respect to the display section 2 is flexed to a state in which it is aligned linearly so as to be along the display section 2.

Figure 7:
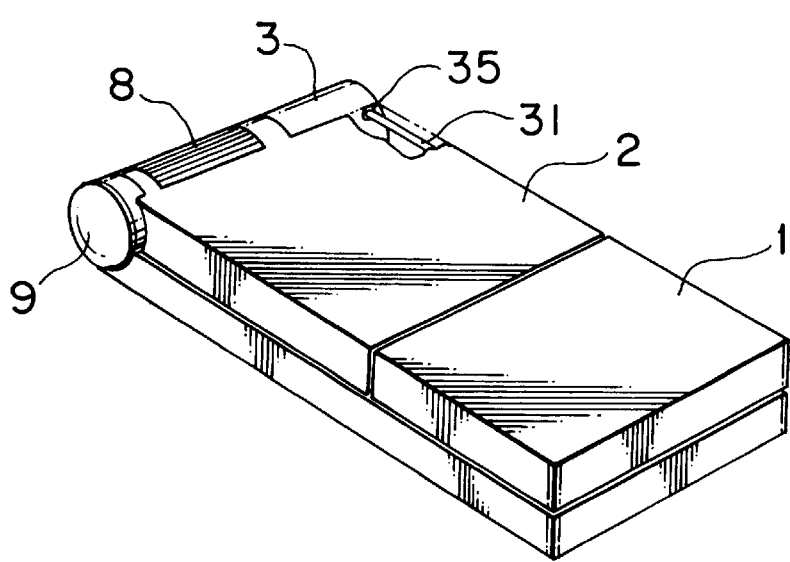
FIG. 7 is a perspective view, partly in cross section, illustrating a state in which the radio telephone set is folded so it is housed.

FIG. 7 is a perspective view, partly in cross section, illustrating a state in which the telephone set is folded so as to be housed. As shown in the figure, since the slide pin 31 built into the display section 2 is engaged with the notch 35 formed in a part of the outer periphery of the joint portion 3 (equivalent to the slide ring 30), the telephone set is stably folded and housed. In this folded and housed state, if the push-button 9 is operated, the receiver section 1 and the display section 2 are turned for use, and the slide pin 31 is slidingly released from the notch 35. As a result, the receiver section 1 is flexed with respect to the display section 2.

Figure 8:
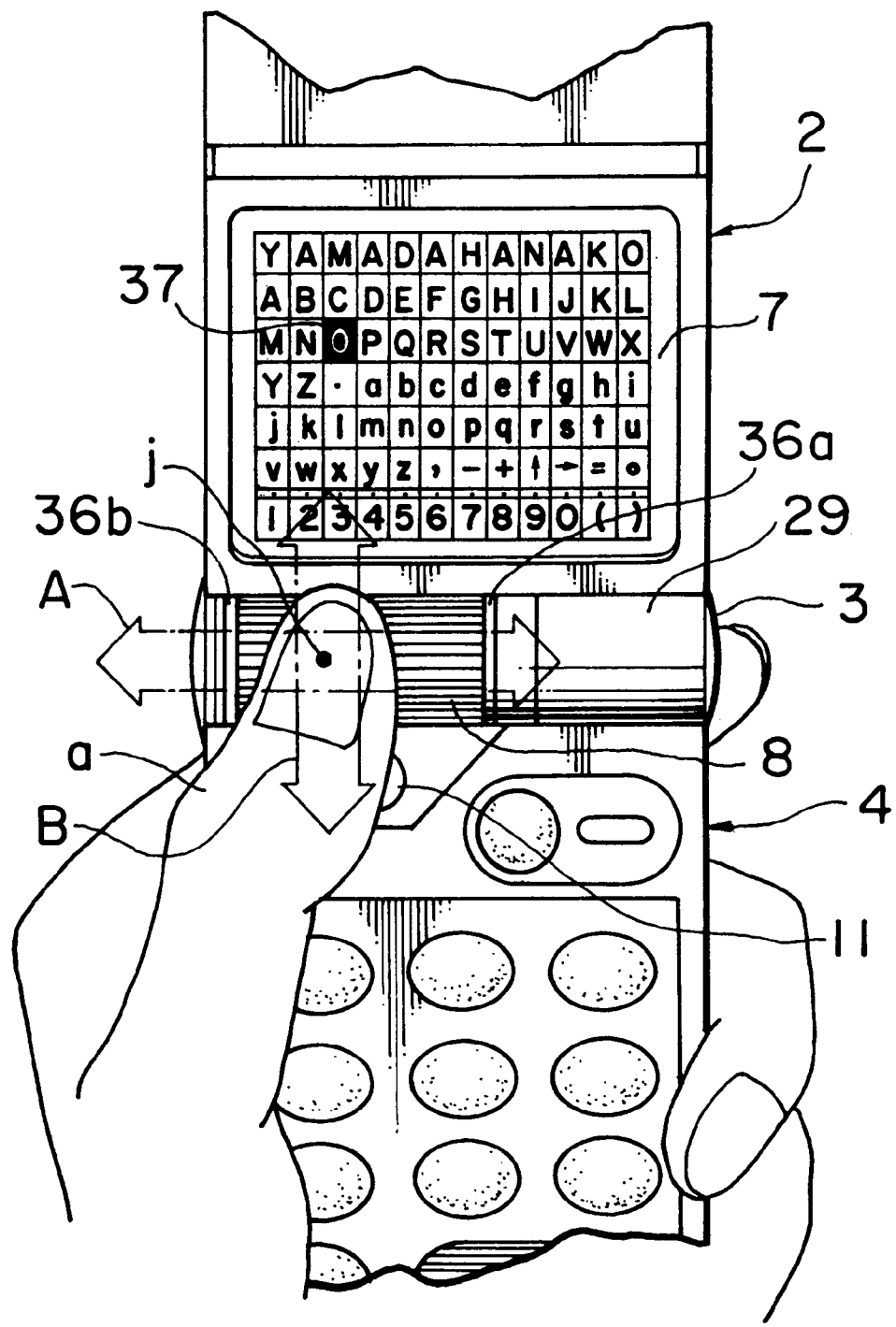
FIG. 8 is a plan view illustrating a method for controlling the position of a cursor by operating the dials of the radio telephone set in accordance with the present invention.

Finally, controlling the position of the cursor by using the selector 8 will be explained. FIG. 8 illustrates a method for controlling the position of the cursor. As shown in the figure, the selector 8, disposed in the joint portion 3, is used to update the position of the noticed display on the liquid-crystal display screen 7, i.e., the position of a cursor 37. When that position is updated, the thumb "a" is operated at will from side to side in the direction of the arrow A or up and down in the direction of the arrow B in a state in which the thumb "a" contacts at a position "j" on the selector 8. That is, when the selector 8 is in a free state, the selector 8 stabilizes while maintaining clearances 36a and 36b of the same size toward the right and left, respectively. The operation using the thumb "a" in the direction of the arrow A changes the size of these clearances 36a and 36b. This change is sensed by a sensor inside the above-mentioned joystick 29. If, for example, the selector 8 is operated to the right, the cursor 37 is moved to the right on the liquid-crystal display screen 7. If the thumb "a" is released from the selector 8, the selector 8 is automatically made to return to the central position. The upward and downward operation of the selector 8 by using the thumb "a" causes the selector 8 to rotate up and down. The direction and the amount of the rotation at that time is sensed by the knob or sensor inside the joystick 29, and the cursor 37 moves up and down on the liquid-crystal display screen 7. What is meant by "sensed by the knob" here is that the amount of the rotation of the selector 8 is determined by voltage, current or the like corresponding to the knob. When a selector exclusively used for controlling the position of the cursor, in addition to the selector 8, is disposed near the selector 8, the selector exclusively used for controlling the position of the cursor is similarly operated, controlling the position of the cursor 37. Therefore, if the cursor 37 is moved successively to a desired position, for example, in a condition in which all necessary characters, numerals, symbols or the like are displayed on the liquid-crystal display screen 7, characters or the like at a moved position are sequentially selected as input subjects, and processed. When the set button 11 is operated on the operation section 4 in a condition in which, for example, the cursor 37 is moved to a desired character position, a list of names and telephone numbers can be displayed in part on the upper portion of the liquid-crystal display screen 7. Up to the present time, desired character strings or the like have been formed solely by operations of ten-keys for a necessary number of times. The operations are troublesome and complex, and key processing, requiring a great number of operations, is necessary. However, when display processing is performed as described above, such inconveniences as described above are reduced.

According to the embodiment of the present invention, as described above, since the rotary selector is disposed in the hinge section of a telephone set which is folded so as to be housed, the hinge section is made to have a desired size so that the mechanical strength of the hinge section can be increased. Since the provision of the rotary selector results in a reduction of key buttons for performing multiple functions, there is an advantage in that the space where the telephone set is arranged can be effectively used.

According to the embodiment of the present invention, there is an advantage in that by using the rotary selector disposed in a terminal, no key buttons exclusively used for controlling the cursor are needed, and the operation with one hand is made easier.

In addition, according to the embodiment of the present invention, the number of necessary key buttons can be reduced since the portable telephone set is provided with a rotary selector, and key buttons and a display of the most appropriate size can be arranged in a telephone set of the most appropriate size. Furthermore, when the rotary selector is disposed in the hinge section of a folding type portable telephone set, the space where the rotary selector is disposed can be reduced.

According to the embodiment of the present invention, since a rotary selector is disposed in the telephone set, it is possible to easily perform various operations necessary, in particular, for conducting a radio telephone conversation with the fingers of one hand while the telephone set itself is being held with the same hand.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A portable radio telephone set comprising:
   an operation section, having a plurality of button keys;
   a microphone;
   a display section for displaying a menu of telephone functions;
   an output section for outputting received voice messages;
   a telephone case housing said operation section, said microphone, said display section, and said output section, and having a front side with said button keys, said microphone said display section, and said output section thereon, and having a rear side; and
   a rotary selector member having an axis, and mounted on said telephone case for rotary movement about said axis, to select a telephone function from the menu displayed on said display section, and for linear movement with respect to said axis, to activate the selected telephone function.

2. A portable radio telephone set as claimed in claim 1, wherein said rotary selector member is positioned to permit operation thereof by a user's thumb.

3. A portable radio telephone set comprising:
   a key panel section having a plurality of button keys for controlling operation of said telephone set;
   a display section for displaying a menu of telephone functions;
   a telephone case housing said key panel section and said display section and having a front side with said button keys and said display section thereon and having a rear side; and
   a selector member having an axis, and mounted on said telephone case for rotary movement about said axis, to select a telephone function from the menu displayed on said display section, and for linear movement with respect to said axis, to activate the selected telephone function.

4. In a portable radio telephone set including an operation section having a plurality of button keys thereon, a display section for displaying a menu of telephone functions, a receiver section for receiving and outputting received voice messages, and a selector member for selecting and activating functions for said portable radio telephone set from the menu displayed on said display section, the improvement wherein said selector member is a rotary selector member having an axis, said rotary selector member being rotatable about said axis to select a function from the menu and being movable linearly with respect to said axis to activate the selected function.

* * * * *